United States Patent
Robertson et al.

(10) Patent No.: US 6,209,077 B1
(45) Date of Patent: Mar. 27, 2001

(54) GENERAL PURPOSE PROGRAMMABLE ACCELERATOR BOARD

(75) Inventors: Perry J. Robertson, Albuquerque; Edward L. Witzke, Edgewood, both of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/217,099

(22) Filed: Dec. 21, 1998

(51) Int. Cl.[7] ............................. G06F 9/28; G06F 13/20; G06F 13/40
(52) U.S. Cl. .......................... 712/17; 712/10; 710/129; 710/62; 711/167; 708/232; 345/503
(58) Field of Search ................... 326/39, 41, 93; 712/15, 17, 10, 11; 710/129, 246, 62, 64, 37; 708/230, 232, 233; 345/503; 711/167, 151

(56) References Cited

U.S. PATENT DOCUMENTS

| | | | |
|---|---|---|---|
| 4,831,573 | * 5/1989 | Norma | 708/230 |
| 5,113,500 | * 5/1992 | Talbott et al. | 710/129 |
| 5,497,498 | 3/1996 | Taylor | 395/800 |
| 5,537,601 | 7/1996 | Kimura et al. | 395/800 |
| 5,600,263 | * 2/1997 | Trimberger et al. | 326/39 |
| 5,603,043 | 2/1997 | Taylor et al. | 395/800 |

OTHER PUBLICATIONS

Singh & Sious, Accelerating Adobe Photoshop with Reconfigurable Logic, pp. 1–9.
Altera, The Evolution of PLD Technology, May 5, 1998, pp. 1–2.
Salcic, VHDL and FLPDs in Digital Systems Design, Prototyping and Customization, pp. 491–493.

* cited by examiner

*Primary Examiner*—Daniel H. Pan
(74) *Attorney, Agent, or Firm*—Peacock, Myers & Adams; George H. Libman

(57) ABSTRACT

A general purpose accelerator board and acceleration method comprising use of: one or more programmable logic devices; a plurality of memory blocks; bus interface for communicating data between the memory blocks and devices external to the board; and dynamic programming capabilities for providing logic to the programmable logic device to be executed on data in the memory blocks.

16 Claims, 1 Drawing Sheet

GENERAL PURPOSE PROGRAMMABLE ACCELERATOR BOARD

GOVERNMENT RIGHTS

The U.S. Government has rights to this invention pursuant to Contract No. DE-AC04-94AL85000 between the U.S. Department of Energy and Sandia Corporation.

BACKGROUND OF THE INVENTION

1. Field of the Invention (Technical Field)

The present invention relates to computer architectures for improving speed of execution of repeating short blocks of instructions particularly for general purpose algorithms or data filters.

2. Background Art

Many computer programs perform the largest portion of their processing (measured in time or CPU cycles) in one or several comparatively short blocks of instructions. Programmers have been traditionally taught to make programs "maintainable", even though that may produce some inefficient computer instruction code, and then go back to identify and optimize the blocks of instructions where the most time is being spent. With a device according to the present invention, compute-intensive blocks of instructions may be placed dynamically into programmable logic devices (PLDs), making thems execute quickly and efficiently.

In the prior art, special-purpose co-processors and accelerators exist, such as numeric co-processors, graphic display accelerators, digital signal processors, and the like, but these are designed to expedite a specific function or narrow set of functions. In other words, they are not general purpose. In the current invention, the data might just as easily be a picture, a series of samples of a data acquisition unit, or the result of the last process step. Processors like the Intel numeric co-processors (8087, 80287, etc.) have a fixed set of microcoded numeric instructions to perform, on demand. Graphic display accelerators are designed to perform graphic manipulations on data passing between the system's bus and the video display unit. Although digital signal processors (DSPs) can be flexibly programmed, their instruction set is designed for signal processing and still have to be decoded before being processed, and so routines written for them do not execute as quickly as routines implemented at the logic gate level, as in the present invention. Image Enhancement Co-Processors (IMECOs) employ PLDs and memory blocks, but do not provide for bi-directional data flows, multiple algorithms, algorithm caching, or memory sub-sampling as provided by the present invention to increase throughput and reduce data congestion of the host microprocessor.

Patents disclosing uses of PLDs quite different from the present invention include: U.S. Pat. No. 5,497,498, to Taylor, entitled "Video Processing Module Using a Second Programmable Logic Device Which Reconfigures a First Programmable Logic Device for Data Transformation"; U.S. Pat No. 5,537,601, to Kimura et al., entitled "Programmable Digital Signal Processor for Performing a Plurality of Signal Processings"; and U.S. Pat. No. 5,603,043, to Taylor et al., entitled "System for Compiling Algorithmic Language Source Code for Implementation in Programmable Hardware". Each of these disclosures is directed to a specific task rather than to the general acceleration strategy of the present invention.

SUMMARY OF THE INVENTION

The present invention is of a general purpose accelerator board and acceleration method comprising use of: a programmable logic device (or devices); a plurality of memory blocks; bus interface for communicating data between the memory blocks and devices external to the board; and dynamic programming capabilities for providing logic to the programmable logic device to be executed on data in the memory blocks. In the preferred embodiment, the bus interface additionally comprises the capability of communicating logic instructions between the programmable logic device and devices external to the board. The board is preferably a PCI board and includes control logic. The board is configurable to perform a multitude of functions including discrete Fourier transforms, convolutions, encryption, decryption, filtering, image processing, and signal processing, or to execute standard system functions and dynamically linked libraries. The board can also be used for library searches and indexing typically performed on ASCII text files. The bus interface is capable of extracting a subset of data from a memory block during execution of the logic and using this data set, in the case of a photograph, for example, to create a sub-sampled representation of the data. The preferred number of memory blocks is two or other multiple of two memory blocks. A plurality of programmable logic devices may be employed together with scheduling logic for coordinating operations of the plurality of programmable logic devices. A caching scheme may be employed to keep often-used logic in the PLDs for use at a future time.

A primary object of the present invention is to provide a general purpose device for accelerating instructions which must be repetitively performed on a large block of data or to speed execution of algorithms that would be slow if performed in software.

A primary advantage of the present invention is that a variety of different application may be accelerated with the use of, if desired, a single co-processing board according to the invention.

Another advantage of the present invention is that it may be reconfigured quickly enough to service multiple algorithms within a process and multiple processes within a computer system.

An additional advantage of the present invention is that it is easily scalable as PLDs with more logic gates become available.

Yet another advantage of the present invention is that it can be built to interface with any of the popular computer buses, including PCI and VME.

Still another advantage of the present invention is that, with on-board memory buffers, data never leaves the board until processing is complete, reducing congestion on the computer system's buses.

A further advantage of the present invention is the optional ability to extract a small portion of a complete data set or a subsampled representative data set, as part of the data processing thereby reducing bus congestion and time required to view the sampled data set via the application-specific hardware programming loaded into the PLDs.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

The present invention is of a device for performing computational transforms on a set of data using programmable logic devices (PLDs) rather than traditional Von Neuman linear instruction processing. Examples of transforms readily accomplished are discrete Fourier transforms, convolutions, encryption and decryption, and filtering. The invention is fittingly described as a general purpose programmable accelerator board.

Figure 1:
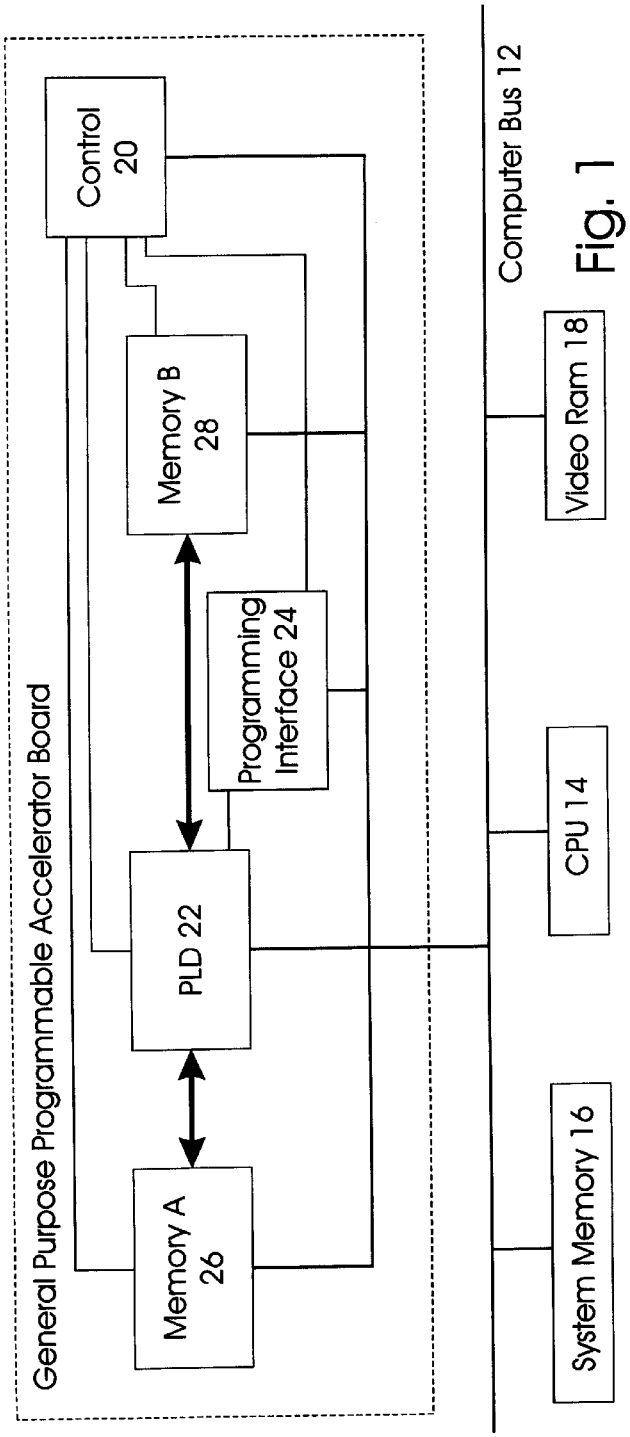
FIG. 1 is a block diagram of the preferred embodiment of the invention.

FIG. 1 illustrates a preferred embodiment of the accelerator board 10 of the invention. The accelerator board is attached to computer bus 12 (such as a PCI bus), on which is located other devices such as central processing unit (CPU) 14, system memory 16, and video random access memory (RAM) 18. The accelerator board comprises controller 20, programmable logic device (PLD) 22, programming interface 24, and memory blocks 26,28. The PLD is preferably an Altera 10K100 PLD, or an equivalent or better device. Depending on preferred applications of the accelerator board, more than two memory blocks may be provided.

In operation, the preferred embodiment processes data from memory 26 through the PLD with the resultant, transformed data being stored in memory 28. This process can continue for as many iterations as necessary, reversing the direction of data flow after each iteration. Alternatively, data could flow in both directions supporting multiple algorithms within the PLD. Such an embodiment would require dual ported memory. The results need not be accessed from outside the accelerator board until after the final transform is completed. Even then, the data can be removed from memory as needed, rather than removing the entire contents at once.

As may readily be understood by one skilled in the art, not only can more than two memory blocks be employed, but multiple PLDs may be used on a single accelerator and multiple accelerators may be connected to the computer bus.

To further illustrate how the accelerator board may work in practice, several applications will now be described. Note that no hardware needs to be changed when switching from one application to another, or from one algorithm to another within an application. However, software packages preferably comprise an additional component, namely hardware description files such as the hardware object files produced by the Altera hardware design process.

One application possible is signal processing. The logic for the discrete Fourier transform, its inverse, and several filter functions could be dynamically loaded into the PLD of the accelerator board. The application program would load the array of time domain points to be transformed into memory 26. The array could then be processed through the PLD, from memory 26 to memory 28, to achieve a transformation into the frequency domain. Frequency domain filtering can then be performed through the PLD as the data is "ping-ponged" back and forth between memories 26 and 28. Finally, as the array of data points makes a last pass between memories, the array goes through an inverse Fourier transform, returning the data to the time domain for other use.

The next person to use the computer may desire to perform image processing. Without physically changing any hardware, the program invoked by this next user may reload the PLD of the accelerator board with image processing filter logic. For example, an 8"×10" image made up of 24-bit RGB (red-green-blue) data, which could be as large as 24 megabytes, would be loaded into memory 26. The first filter operates on the data and deposits the result in memory 28. Another function may extract a portion of the image for display on a monitor in the midst of the processing. This view may be much smaller than the full data set. Transformations may be repeated until the user is happy with the appearance of the data, at which time the entire image can be transferred back to system memory or external storage (i.e., a hard disk, writable compact disk, or the like).

A further person could then employ the computer for cryptographic processing of large amounts of data. The software component would load the appropriate cryptographic logic (such as public-key encryption, DES, or like algorithms) into the PLD. The software could then route blocks of data to the accelerator board as needed for processing. After processing, the blocks of data are returned to the CPU and system memory for disposition (write to disk, sent out over communications channels, displayed on an output device, etc.).

The accelerator board is also useful for containing system functions or dynamic linked libraries (DLLs). Software applications could then sense the presence or absence of the accelerator board (as microprocessors can sense presence/absence of a numeric co-processor) and call either the hardware or software version of the DLL, as appropriate. Using hardware DLLs and/or system libraries improves performance of certain applications that are compute intensive. It is possible also to dynamically cache the most recently used system functions and/or DLLs in the PLD of the accelerator board to increase performance. This is distinct from other hardware accelerators in that the most commonly used functions are retained in reconfigurable hardware, up to the limits imposed by the size of the PLD, rather than having to be selected and installed at design/manufacture time.

Figure 2:
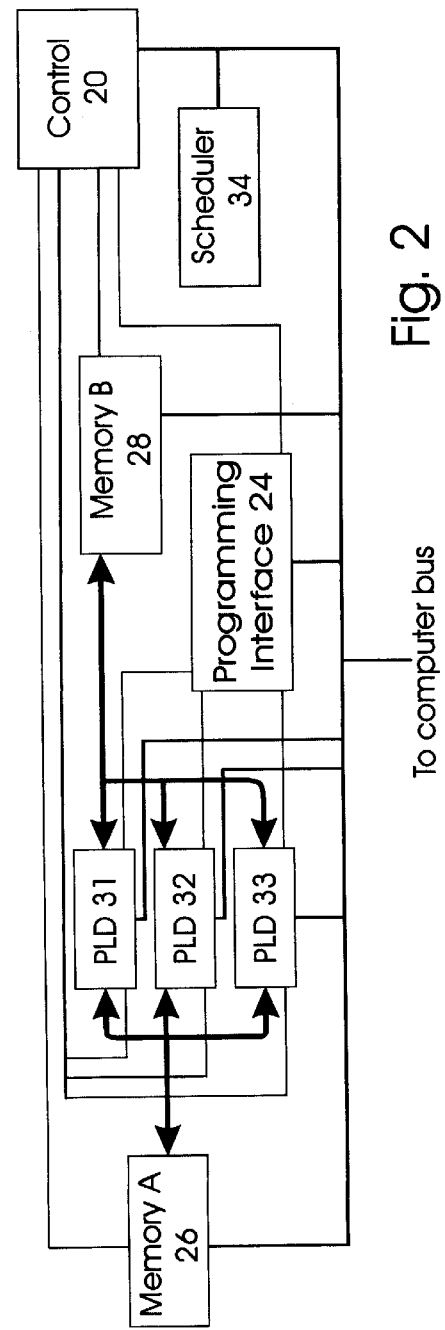
FIG. 2 is a block diagram of an alternative embodiment of the invention.

An alternate embodiment is shown in FIG. 2. Here, multiple PLDs 31,32,33 are employed, together with scheduling logic 34. Multiple programming interfaces may be desired. One use of this embodiment is to permit programming of a PLD while another is engaged in processing data. For example, one operation (e.g., image processing) may be executing in the host system's CPU and the PLD 31. Another operation (e.g., encryption to be done on the processed image) may be pending. While the logic to accelerate the image processing is executing in PLD 31, the logic to accelerate the encryption can be loaded into PLD 32. When needed, PLD 32 is ready to operate on the data without having to wait for a PLD to be reloaded with new logic.

The known techniques for resource management in operating systems can be usefully applied to this alternative embodiment. The PLDs are resources that need to be scheduled/allocated according to the needs of the user application and/or operating system. If one can predict what hardware routines are going to be needed and approximately when, these could be loaded several PLDs in advance and context switched when needed.

The present invention provides a means whereby a hardware representation of logic to be expedited may be dynamically loaded which, when combined with large on-board memory blocks, has not heretofore been known. This general purpose programmable accelerator board has application to a wide variety of information-processing applications.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A general purpose accelerator board comprising:

a programmable logic device having input/output ports and control signal ports;

a plurality of memory blocks operationally connected to said input/output ports;

bus interface means for communicating data between said memory blocks and devices external to said board; and dynamic programming means for providing logic to said programmable logic device to be executed on data in said memory blocks.

2. The board of claim 1 wherein said bus interface means additionally comprises means for communicating logic instructions between said programmable logic device and devices external to said board.

3. The board of claim 1 additionally comprising control logic means operationally connected to said control signal ports.

4. The board of claim 1 wherein said board comprises a PCI board.

5. The board of claim 1 wherein said programmable logic device is configurable to perform each of the computational transforms selected from the group consisting of discrete Fourier transforms, convolutions, encryption, decryption, filtering, image processing, and signal processing.

6. The board of claim 1 wherein said board is configurable to execute standard system functions and dynamical linked libraries for a device external to said board.

7. The board of claim 1 wherein said bus interface means is capable of extracting a subset of data from a memory block during execution of said logic.

8. The board of claim 1 wherein said plurality of memory blocks comprises a multiple of two memory blocks.

9. A general purpose computer acceleration method comprising the steps of:

a) providing a programmable logic device having input/output ports and control signal ports;

b) providing a plurality of memory blocks operationally connected to said input/output ports;

c) providing bus interface means for communicating data between the memory blocks and devices external to the board;

d) dynamically providing logic to the programmable logic device; and e) moving data from one memory block to another memory block through the programmable logic device, said programmable logic device transforming said data in response to said logic.

10. The method of claim 9 wherein the step of providing bus interface means additionally comprises providing means for communicating logic instructions between the programmable logic device and external devices.

11. The method of claim 9 additionally comprising the step of providing control logic means operationally connected to said control signal ports.

12. The method of claim 9 wherein the providing steps comprise providing to a PCI board.

13. The method of claim 9 wherein said programmable logic device performs a computational transform selected from the group consisting of discrete Fourier transforms, convolutions, encryption, decryption, filtering, image processing, and signal processing.

14. The method of claim 9 additionally comprising the step of executing standard system functions and dynamical linked libraries for an external device.

15. The method of claim 9 wherein the step of providing bus interface means comprises providing means capable of extracting a subset of data from a memory block during execution of the logic.

16. The method of claim 9 wherein the step of providing a plurality of memory blocks comprises providing a multiple of two memory blocks.

* * * * *